United States Patent

[11] 3,599,560

| [72] | Inventor | Ogden A. Clemens<br>Chicago, Ill. |
|---|---|---|
| [21] | Appl. No. | 2,301 |
| [22] | Filed | Jan. 12, 1970 |
| [45] | Patented | Aug. 17, 1971 |
| [73] | Assignee | Swift & Company<br>Chicago, Ill. |

[54] SLICED MEAT MANUFACTURE
3 Claims, 3 Drawing Figs.

[52] U.S. Cl. ................................................. 99/355,
99/358, 219/469
[51] Int. Cl. .................................................... H05b 7/06
[50] Field of Search ........................................... 99/358,
244, 274, 353, 355, 380, 386, 426, 427, 443 C;
219/388, 395, 469, 471

[56] References Cited
UNITED STATES PATENTS

| 1,624,029 | 4/1927 | Whitcomb | 219/469 |
|---|---|---|---|
| 1,965,618 | 7/1934 | Vogt | 99/244 X |
| 2,209,824 | 7/1940 | Louisot et al. | 99/353 UX |
| 2,532,562 | 12/1950 | Lorig | 219/469 |
| 2,572,833 | 10/1951 | Balzarini | 99/353 UX |
| 2,812,729 | 11/1957 | Bahlsen | 99/443 C X |
| 3,239,652 | 3/1966 | Price | 219/469 |
| 3,249,738 | 5/1966 | Simm et al. | 219/469 |
| 3,294,545 | 12/1966 | Cunningham et al. | 99/353 X |

Primary Examiner—William I. Price
Assistant Examiner—Arthur O. Henderson
Attorneys—Edward T. McCabe, Wilbur C. Davis and Charles E. Bouton ABSTRACT: An apparatus for producing continuous ribbons of cooked meat emulsions suitable for individual slices comprising: a forming roller having at least one continuous forming zone on the outer surfaces; a feeding means for supplying a meat emulsion to each said forming zone; an endless conductive belt passing around a portion of the periphery of said roller and operable to move in unison therewith, whereby at least one enclosed forming zone is produced between the belt and roller in which the meat emulsion is encased; and an electric circuit means for passing an electric current from the roller through the meat emulsion to the belt when the meat emulsion is encased in the forming zone, said current being sufficient to at least partially coagulate the meat protein.

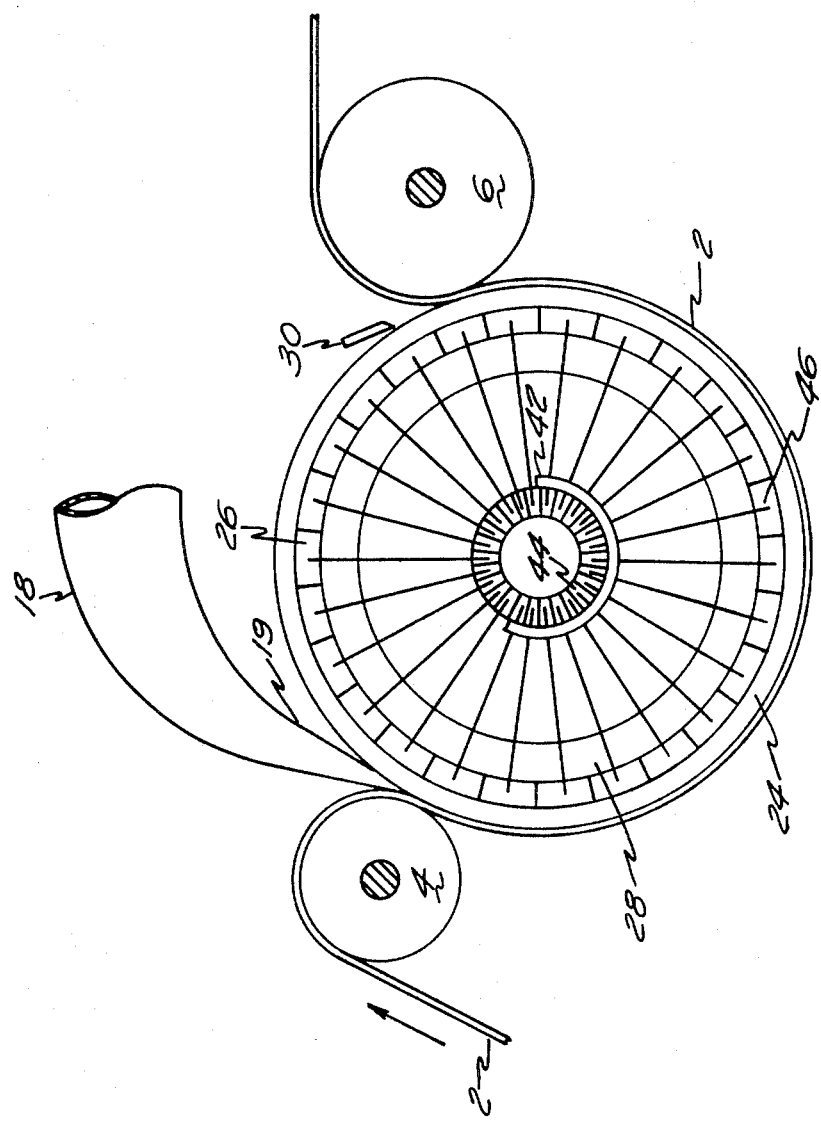

SLICED MEAT MANUFACTURE

The present invention relates to an apparatus for forming continuous ribbons of cooked sausage emulsions and more specifically to an apparatus for producing sliced meat products in a thin sheet form suitable for sandwich making and the like and for packaging individual or multilayer form.

It is therefore an object of this invention to provide an apparatus for producing one or more continuous ribbons of fully cooked sausage-type meat product.

It is another object of the present invention to provide an apparatus for heating one or more continuous ribbons of meat emulsion to coagulation temperatures by electrical resistance heating.

It is still another object of the present invention to provide an apparatus for coagulating at least one continuous ribbon of meat emulsion, means for thoroughly cooking and/or flavoring said emulsion and means for slicing, stacking and wrapping the cooked meat slices.

Other specific objects and many of the attendant advantages of this invention will be readily appreciated as the same becomes better understood by reference to the following detailed description when considered in connection with the accompanying drawings in which like reference numerals designate like parts throughout the figures thereof wherein:

FIG. 3 is a sectional side elevation of a portion of FIG. 1.

Figure 1:
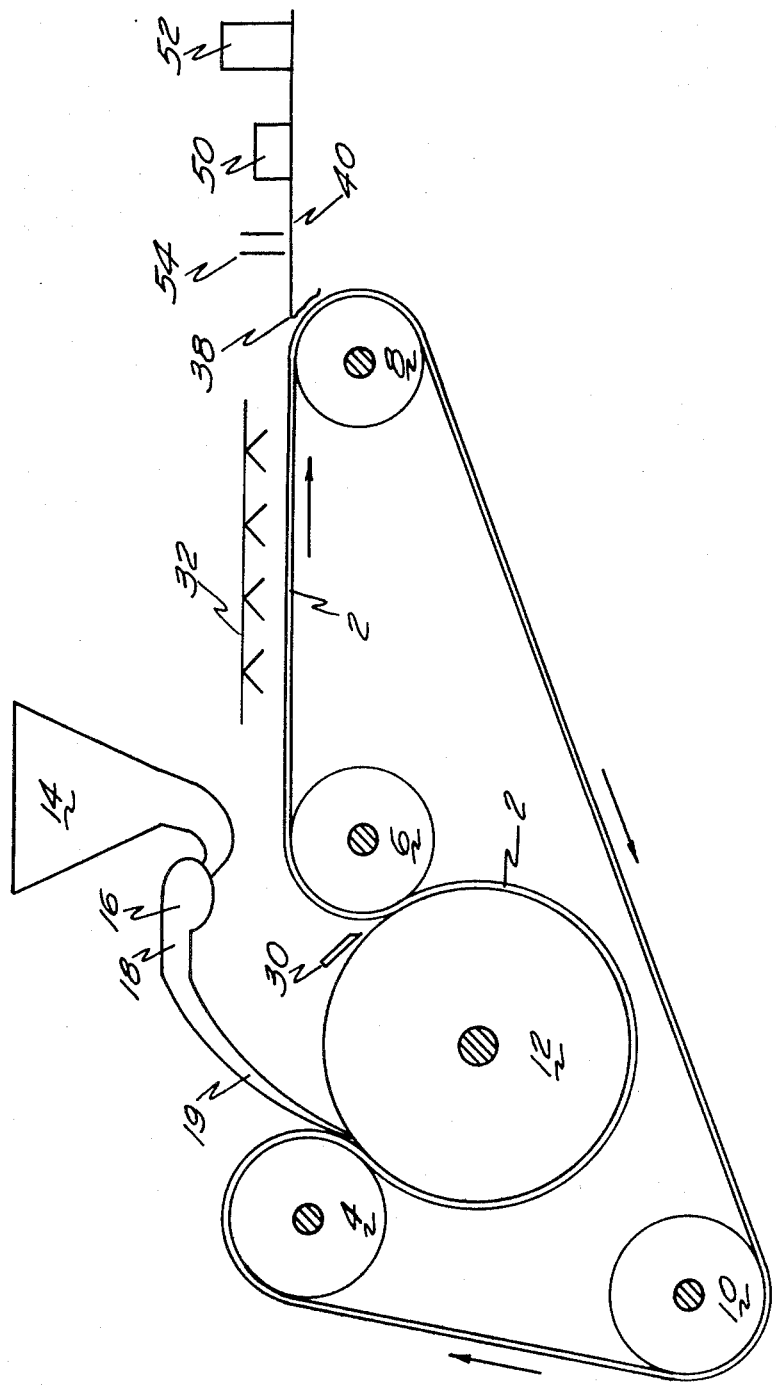
FIG. 1 illustrates a side elevation of a preferred embodiment of the cooking portion of the invention.

Referring now to the drawings, wherein like reference characters designate like or corresponding parts throughout the several drawings there is shown in FIG. 1 a conductive endless belt 2 which is constructed of stainless steel or other suitable conductive material and which is trained over a series of spaced rotatable drums 4, 6, 8, 10 and 12. A hopper 14 for storing the meat emulsion feeds said emulsion into a meat pump 16 which passes the meat emulsion through a stuffing horn 18 and out through a stuffing nozzle 19 and into a forming zone(s) 22 positioned on the rotating face of a forming roller 12. A ribbon of meat emulsion 20 is continuously fed from each stuffing nozzle 19 into forming zone(s) 22 and is compressed therein by a pressure roller 4 which presses the conductive belt 2 firmly against a series of parallel Teflon insulator bands 24, shown in FIG. 2, which are attached to the periphery of the forming roller 12 and which forms the sidewalls of each said forming zone 22. The conductive belt 2 is rotated by means of a sprocket roller 10 at a speed synchronized with the rotation of the forming roller 12 and drum rollers 4, 6, and 8.

After each ribbon of meat emulsion 20 is passes into the forming zone(s) 22 it is brought into close contact with electrodes 26 and with the conductive belt 2 thereby forming a complete circuit through which electric current is passed. The ribbons of meat emulsion 20 are continuously heated while encased within the forming zone 22 by an electric current passing between the electrodes 26 and the conductive belt 2 and resistance of the emulsion 20 to said current produces temperatures sufficient to coagulate the meat proteins or about 125° F. After being heated for a partial revolution of the forming roller 12, the direction of belt 2 is changed to a horizontal plane by means of a stripper roller 6 and the emulsion 20 is transferred from the forming zone 22 by means of a roll scraper 30 to the belt 2 and is carried thereon through a heating zone or oven 32 wherein it may be subjected to several different operations for development of the color and flavor. The ribbons of meat emulsion 20 are then removed from the conductive belt 2 by means of belt scraper 38 and passed onto a conveyor 40 which passes the cooked meat to a suitable apparatus for slicing 54, stacking 50 and packaging 52.

It is, of course, understood that the width and thickness of the ribbon of meat emulsion may be regulated by varying the spacing and height of the Teflon insulators 24. The amount of heat generated within the forming zone is regulated by the amount of current passed through the emulsion and the rotating speed of the forming roller 12. Any number of forming zones may be incorporated on the forming roller depending solely upon the size of the equipment employed.

Figure 2:
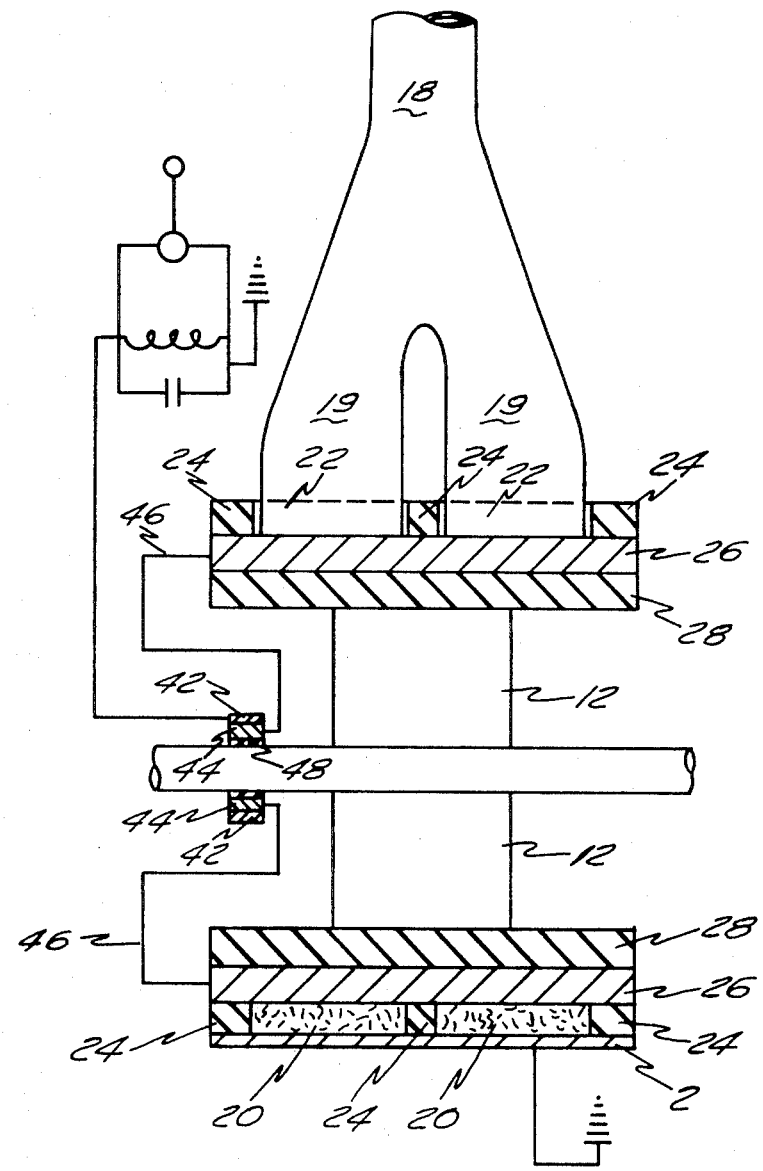
FIG. 2 is a sectional view of FIG. 1 along the indicated A-A' plane, rotated 90°.

Referring to FIGS. 2 and 3 the electrical current used in heating the ribbon of meat emulsion 20 may be supplied from any suitable source such as 10,000 cycle Tocco generator (not shown) which is connected to a stationary semicircular brush 42 which may be constructed of such materials as carbon, copper or the like and which is enclosed over a commutator ring 44 fixedly attached to insulator band 48 which is attached to roller 12 and each section of which is connected to separate electrode 26 by means of a wire 46. Each electrode 26 extends transversely across the face of the forming roller 12 in rectangular form and is attached to an insulator 28 and positioned adjacent to one another to form a continuous rolling surface on the forming roller. The arrangement of the brush is such that electric current is supplied only to those electrodes 26 extending from the pressure roller 4 to the stripper roller 6. The conductive belt 2 acts as a ground for the electric current.

It is to be understood that numerous modifications will readily occur to those skilled in the art upon reading this description. All such modifications are intended to be included within the scope of the invention as defined in the accompanying claims.

Obviously many modifications and variations of the invention as hereinbefore set forth may be made without departing from the spirit and scope thereof, and, therefore, only such limitations should be imposed as are indicated in the appended claims.

I claim:

1. An apparatus for preparing multiribbons of meat emulsion suitable for forming into meat slices comprising: a drum rotatable about a shaft and having a surface of nonconductive material; a series of rectangular electrodes extending transversely across the outer surface of the drum and each positioned adjacent to each other thereby forming a continuous surface on the drum; a plurality of parallel nonconductive bands attached to the electrodes and extending circumferentially about the drum to define at least one forming zone; an endless conductive belt positioned transverse to the bands and extending circumferentially over a portion of the drum, the belt operable to move in unison with the drum; a commutator ring fixedly attached to the drum for rotation therewith, each section of which is electrically connected to a separate electrode; a stationary semicircular conductive brush contacting those sections of the ring forming an electrical circuit with the belt; a power source for supplying current to the brush; and means for supplying a continuous ribbon of meat emulsion to each forming zone, the supply means being positioned adjacent to the initial contact point of the belt and drum, whereby the meat completes the electric circuit between the belt and power source.

2. An apparatus for producing continuous ribbons of cooked meat emulsions suitable for individual slices comprising: a forming roller having at least one continuous forming zone on the outer surfaces; a feeding means for supplying a meat emulsion to each said forming zone; and endless conductive belt passing around a portion of the periphery of said roller and operable to move in unison therewith, whereby at least one enclosed forming zone is produced between the belt and roller in which the meat emulsion is encased; and an electric circuit means for passing an electric current from the roller through the meat emulsion to the belt when the meat emulsion is encased in the forming zone, said current being sufficient to at least partially coagulate the meat protein.

3. An apparatus for the continuous preparation of meat slices comprising, in combination: a rotating drum having a surface of nonconductive material; a series of rectangular electrodes extending transversely across the outer surface of said drum and each positioned adjacent to each other thereby forming a continuous surface thereon; a plurality of raised insulator strips attached to the electrodes and positioned circumferentially about the periphery of the drum in parallel relation to one another to define at least one forming zone; a stuffing horn having a nozzle positioned within the forming zone to extrude a continuous sheet of meat emulsion therein; means for forcing a continuous stream of meat emulsion through the stuffing horn; an endless conductor belt positioned transverse to the raised insulator strips and extending circumferentially over a portion of the drum, the belt operable to move in unison with the drum; electrical means within the drum for supplying an electric current from an outside source to the electrodes, whereby the current passes from the electrodes, through the meat emulsion within the forming zone to the conductive belt; means for changing the direction of the belt to a horizontal path and for transferring the meat emulsion from the drum to the belt; heating means positioned adjacent to the path of the belt for fixing the color and flavor of the meat; and means for cutting, stacking, and slicing the cooked meat.